June 9, 1925.

A. A. KRAMER

FAUCET

Filed June 9, 1922

1,540,782

INVENTOR
Andrew A. Kramer
BY
ATTORNEY

Patented June 9, 1925.

1,540,782

UNITED STATES PATENT OFFICE.

ANDREW A. KRAMER, OF KANSAS CITY, MISSOURI.

FAUCET.

Application filed June 9, 1922. Serial No. 567,151.

*To all whom it may concern:*

Be it known that I, ANDREW A. KRAMER, a citizen of the United States, residing at Kansas City, in the county of Jackson and State of Missouri, have invented certain new and useful Improvements in Faucets; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to tank faucets and it is one of the important features of the invention to provide a faucet with a plurality of valves, one of which is the ordinary service valve and the other a safety valve; the safety valve having a normal tendency to close and adapted to be moved into closing position independently of the service valve so that in the event that the service valve has a tendency to leak, the safety valve will close the pipe line. Mechanism is provided whereby upon a deliberate opening of the service valve, the safety valve will be opened so as to permit the pipe line to be unobstructed.

The device is particularly applicable to tank wagons. Tank wagons are usually provided with a safety valve which is normally unseated but which is adapted to close the port between the compartment of the tank and the service pipe. Such valves are usually accessible from the top of the tank wagon and must be tripped in order to shut off the pipe. If fires occur from drippings or from other causes, it is not always convenient for the driver of the wagon to climb to the top of the tank to operate the safety valve, so these safety valves are of practically little use.

According to my invention, however, the safety valve is normally closed and in that particular, operates differently from the known safety valves. The safety valve embodied in my invention, however, will open each time the service valve in the faucet is opened, due to co-related mechanism, so that while the pipe line is normally closed in front of the faucet, it may be opened each time the faucet is opened.

The novel construction of the invention will be apparent by reference to the following description in connection with the accompanying drawings, in which—

Figure 1:
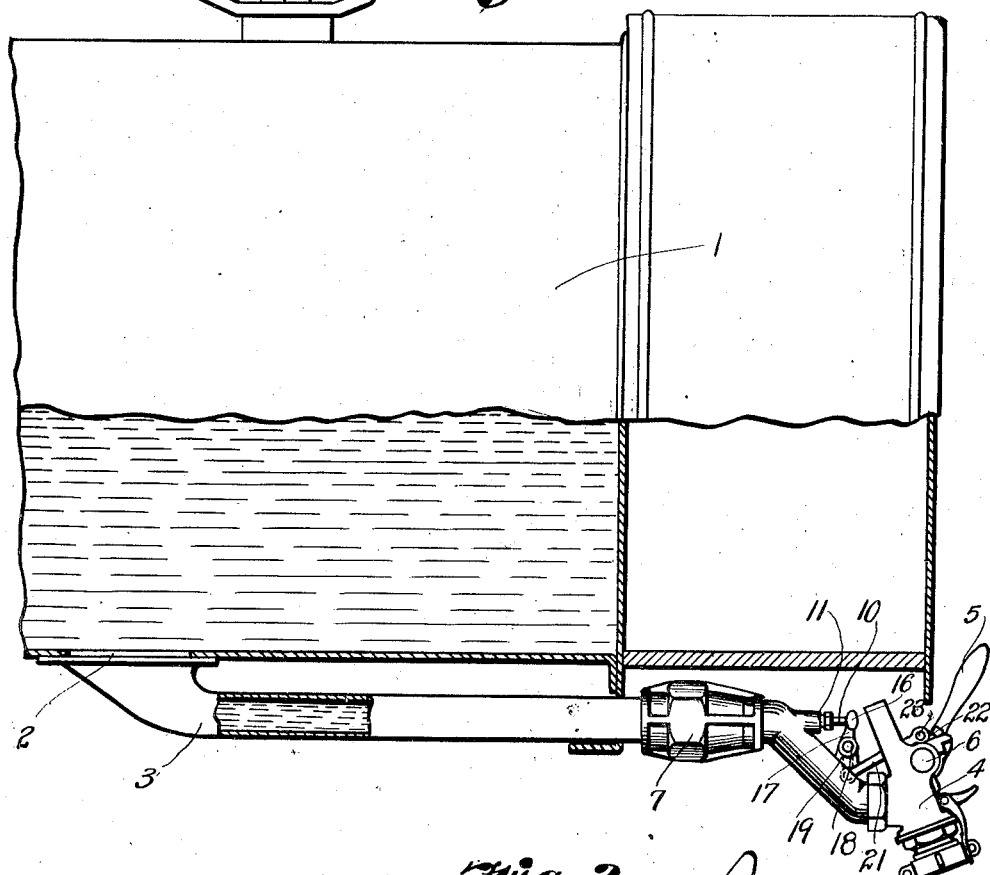
Fig. 1 is a fragmentary view of a tank or tank wagon, part of the tank and part of the pipe line being shown in section, the faucet and safety valve casing being shown in elevation.

The dispensing tank 1 is shown as provided with a discharge opening 2 through which the liquid discharges into the service pipe 3. At the discharge end of the service pipe is a faucet casing 4, having an appropriate valve therein adapted to be operated by a valve lever 5; the construction of the interior of the faucet casing 4 and the valve constituting no part of my present invention as any appropriate valve may be employed.

I have shown the lever 5, however, as fulcrumed at 6.

Between the port 2 and the faucet casing 4 is a safety valve casing 7, having a valve seat 8 to receive a valve 9 provided with a stem 10, which extends through a stuffing box 11 in the offset pipe member 12. The member 12 is connected to the main pipe line 3 by the casing 7 which constitutes a coupling but in effect the member 12 is a continuation of the pipe 3, it being offset, however, as its shape mechanically adapts it for the operating mechanism to be hereinafter described.

Within the safety valve casing 7 is a spider 13, which constitutes a guide for the stem 10 and against which one end of a coil spring 14 bears, the other end of the coil spring bearing against a pin 15 extending transversely through the stem 10. The spring is an expansion spring so that it will normally tend to close or seat the valve 9.

Figure 2:
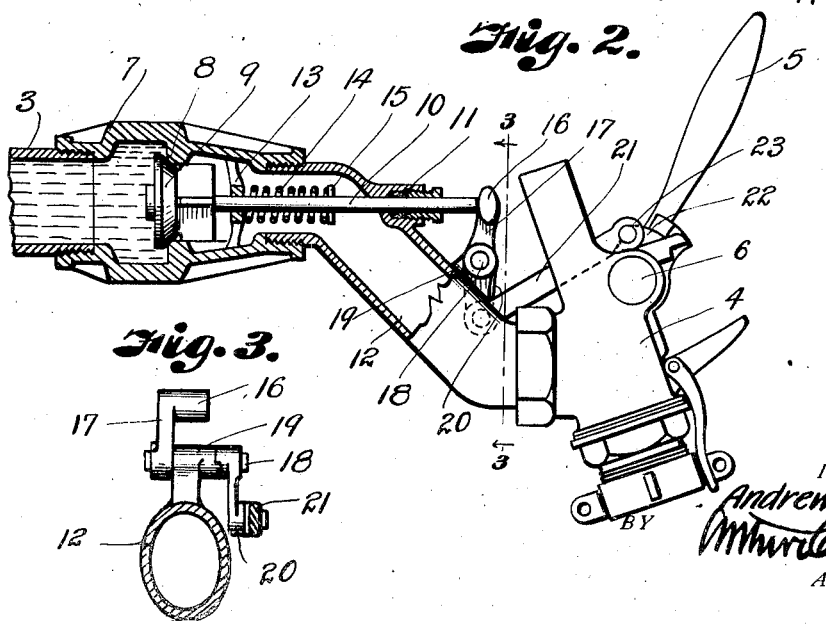
Fig. 2 is a view partly in section and partly in elevation through the pipe, the faucet being shown in elevation and the safety valve casing being shown in section.
Figure 3:
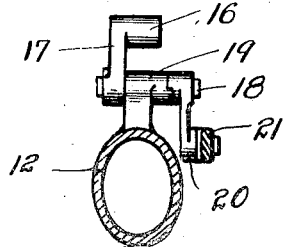
Fig. 3 is a cross sectional view on the line 3—3 of Fig. 2.

By reference to Figs. 1 and 2 it will be observed that the stem 10 extends through the stuffing box 11 and that its end is adapted to come into contact with the free end 16 of a crank 17 on the rock shaft 18 mounted in the bracket 19 carried by the pipe member 12. One end of the rock shaft 18 has a depending crank 20 connected to the operating handle 5 by a link 21 so that the crank 17 will move in unison with the handle 5.

When the parts are assembled as shown in Figs. 1 and 2, the safety valve 9 will be normally seated because the faucet valve will be closed. When it is desired to dispense the liquid, however, the handle 5 will be moved from left to right to move the valve in the faucet casing 4 off its seat. The link 21 will pull the crank 20 forwardly and impart a reverse movement to the crank 17 so that the lateral end 16 will exert pressure against the projecting end of the stem 10, moving the stem in a rearward direction and since the valve 9 is fastened to it, the valve 9 will be unseated, allowing free passage of the liquid through the pipe and through the faucet. Just as soon as the handle 5 is released or moved from right to left, the spring 14 will cause the valve 9 to close so that, irrespective of the valve in the faucet, the safety valve will move to closing position and since there is little chance of both valves leaking at the same time, it will be apparent that the liability of the liquid leaking from the tank will be reduced to a minimum.

It will be observed that the operating mechanism co-operating with the normal faucet for unseating the valve 9 is outside the faucet where it will be readily accessible and that the link 21 is fastened to the base 22 of the lever 5 at 23. Therefore, if desired, the handle of the lever 5 can be removable, a structure sometimes used in connection with faucets of this kind, so as to prevent the faucets being tampered with by unauthorized persons. The removable handle, however, is not a part of the invention but is merely mentioned to indicate that the present invention is susceptible for use in connection with this type of faucet operating mechanism.

What I claim and desire to secure by Letters-Patent is:

1. In combination with a dispensing conduit and a faucet at the discharge end of the conduit, a valve in the conduit, normally yieldingly held in closed position and having a stem extending to the exterior of the conduit, a handle for the faucet, and means operable by said handle and on said stem to unseat the valve when the faucet is opened.

2. In combination with a dispensing conduit and a faucet at the discharge end of the conduit, a valve in the conduit, normally yieldingly held in closed position and having a stem extending to the exterior of the conduit, a handle for the faucet and means exterior to the valve and faucet operable by the handle and engageable with said stem to unseat the valve when the faucet is opened, the valve reseating automatically when the faucet is closed.

3. The combination with a dispensing pipe for tanks and a faucet at one end thereof having a manually operated valve, of a safety valve normally closing the pipe having a stem projecting therethrough, a rock shaft carried by the pipe, a crank having a portion in line with the stem, and a link connection between the crank and the manually operated valve whereby when the manually operated valve has moved to open position, the crank will exert pressure against the stem to cause the safety valve to move into open position.

4. The combination with a dispensing pipe for tanks and a faucet at one end thereof having a manually operated valve, of a safety valve normally closing the pipe having a stem projecting therethrough, a rock shaft carried by the pipe, a crank having a portion in line with the stem, a link connection between the crank and the manually operated valve whereby when the manually operated valve has moved to open position, the crank will exert pressure against the stem to cause the safety valve to move into open position, and a spring for returning the safety valve to closing position when pressure is relieved upon the stem.

In testimony whereof I affix my signature.

ANDREW A. KRAMER.